US012762333B2

(12) United States Patent
Zhang

(10) Patent No.: US 12,762,333 B2
(45) Date of Patent: Oct. 13, 2026

(54) METHOD FOR PROCESSING ONLINE SPREADSHEET

(71) Applicant: Beijing Zitiao Network Technology Co., Ltd., Beijing (CN)

(72) Inventor: Lei Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 244 days.

(21) Appl. No.: 18/614,342

(22) Filed: Mar. 22, 2024

(65) Prior Publication Data

US 2024/0320419 A1 Sep. 26, 2024

(30) Foreign Application Priority Data

Mar. 22, 2023 (CN) ........................ 202310287719.7

(51) Int. Cl.
*G06F 40/18* (2020.01)
*G06F 16/178* (2019.01)
*G06Q 10/101* (2023.01)

(52) U.S. Cl.
CPC ............ *G06F 40/18* (2020.01); *G06F 16/178* (2019.01); *G06Q 10/101* (2013.01)

(58) Field of Classification Search
CPC ...... G06F 40/18; G06F 16/178; G06F 40/174; G06Q 10/101
See application file for complete search history.

(56) References Cited

U.S. PATENT DOCUMENTS 6,006,239 A * 12/1999 Bhansali ................ G06Q 10/10
8,516,050 B1 * 8/2013 Chapweske ........ H04N 1/00244
709/204
8,812,625 B1 * 8/2014 Chitilian ............ G06F 16/2322
709/224
2008/0172598 A1 7/2008 Jacobsen et al.
(Continued)

FOREIGN PATENT DOCUMENTS

CN 106663088 A 5/2017
CN 110008455 A 7/2019
(Continued)

OTHER PUBLICATIONS

Neil Fraser, Differential Synchronization, ACM, 2009 (Year: 2009).*
(Continued)

*Primary Examiner* — Nicholas Ulrich
(74) *Attorney, Agent, or Firm* — Astute IP Law Group

(57) ABSTRACT

A method for processing an online spreadsheet and a device are provided. The method includes: acquiring, in response to an editing operation triggered by a user for the online spreadsheet display on a client terminal and received by the client terminal, an editing area corresponding to the editing operation by the client terminal, wherein the editing area includes a plurality of cells; acquiring editing data corresponding to the plurality of cells by the client terminal, wherein the editing data includes attribute values respectively edited for each cell of the plurality of cells; obtaining a message body according to the editing data; and sending the message body to a server by the client terminal.

13 Claims, 4 Drawing Sheets

(56) References Cited

U.S. PATENT DOCUMENTS

| | | | | |
|---|---|---|---|---|
| 2013/0124649 | A1* | 5/2013 | Triantos | H04L 51/046 709/206 |
| 2015/0199328 | A1* | 7/2015 | Danziger | G06F 40/18 715/219 |
| 2015/0378980 | A1* | 12/2015 | Cuomo | G06F 16/2237 715/219 |
| 2016/0162461 | A1* | 6/2016 | Simon | G06F 3/0484 715/220 |
| 2021/0027608 | A1 | 1/2021 | Shakedd et al. | |
| 2022/0050961 | A1* | 2/2022 | Hariri | G06F 40/197 |

FOREIGN PATENT DOCUMENTS

| | | | |
|---|---|---|---|
| CN | 110020328 | A | 7/2019 |
| CN | 113722345 | A | 11/2021 |
| CN | 114169303 | A | 3/2022 |

OTHER PUBLICATIONS

Office Action for Chinese Patent Application No. 202310287719.7, mailed on Aug. 12, 2025, 27 pages.

Notice of Allowance for Chinese Patent Application No. 202310287719.7, mailed on Jan. 26, 2026, 13 pages.

* cited by examiner

| | | | | | | | |
|---|---|---|---|---|---|---|---|
| Home | | | | | | | |
| Home | | | | | | | |
| Home | | | | | | | |
| Home | | | | | | | |
| Home | | | | | | | |
| Home | | | | | | | |
| Home | | | | | | | |
| | | | | | | | |
| | | | | | | | |
| | | | | | | | |
| | | | | | | | |
| | | | | | | | |
| | | | | | | | |

METHOD FOR PROCESSING ONLINE SPREADSHEET

CROSS-REFERENCE TO RELATED APPLICATION

The present application claims priority of the Chinese Patent Application No. 202310287719.7, filed on Mar. 22, 2023, the disclosure of which is incorporated herein by reference in the present application.

TECHNICAL FIELD

The present disclosure relates a method and an apparatus for processing an online spreadsheet.

BACKGROUND

Online spreadsheets are becoming more and more widely used due to their features such as supporting multi-person collaborative editing. Currently, when a user edits the online spreadsheet, the server can synchronize the editing results to other users.

Currently, when multiple users edit an online spreadsheet at the same time, there will be a problem that the content displayed in the online spreadsheet is inconsistent with the user's operation. Therefore, there is an urgent need for a solution that can solve the above problem.

SUMMARY

In order to solve or at least partially solve the above-mentioned technical problems, embodiments of the present disclosure provide a method and an apparatus for processing an online spreadsheet.

In a first aspect, the embodiments of the present disclosure provide a method for processing an online spreadsheet, and the method includes:

- acquiring, in response to an editing operation triggered for the online spreadsheet, an editing area corresponding to the editing operation, in which the editing area includes a plurality of cells;
- acquiring editing data corresponding to the plurality of cells, in which the editing data includes attribute values respectively edited for each cell of the plurality of cells;
- obtaining a message body according to the editing data;
- and sending the message body to a server.

Optionally, acquiring editing data corresponding to the plurality of cells includes:

- traversing each cell in the editing area to obtain the editing data.

Optionally, obtaining the message body according to the editing data includes:

- obtaining a target array corresponding to each cell according to the attribute values respectively edited for each cell of the plurality of cells, in which the plurality of cells includes a first cell, a target array corresponding to the first cell includes at least one element, each element of the at least one element corresponds to one cell attribute, and a value of each element is used to indicate an attribute value of a cell attribute corresponding to the each element;
- and obtaining a message body including the target array corresponding to each cell, according to the target array corresponding to each cell.

Optionally, the target array corresponding to the first cell includes a first element, a cell attribute corresponding to the first element is a value of a cell, and a value of the first element is a value of the cell.

Optionally, the target array corresponding to the first cell includes a second element, a cell attribute corresponding to the second element is a first attribute, the first attribute is not a value of the cell, and a value of the second element is an identifier of an attribute value of the first attribute.

Optionally, obtaining a target array corresponding to each cell according to the attribute values respectively edited for each cell of the plurality of cells, includes:

- acquiring the attribute value of the first attribute corresponding to the first cell;
- obtaining the identifier according to the attribute value of the first attribute;
- and obtaining the target array corresponding to the first cell according to the identifier.

Optionally, obtaining the identifier according to the attribute value of the first attribute includes:

- querying an attribute manager corresponding to the first attribute using the attribute value of the first attribute;
- in response to the attribute manager including a corresponding relationship between the attribute value and the identifier corresponding to the attribute value, acquiring the identifier from the attribute manager;
- and in response to the attribute manager not including the attribute value, generating the identifier, and storing the corresponding relationship between the attribute value and the identifier in the attribute manager.

Optionally, the method further includes:

- sending the attribute manager corresponding to the first attribute to the server.

Optionally, obtaining a target array corresponding to each cell according to the attribute values respectively edited for each cell of the plurality of cells, includes:

- obtaining an initial array corresponding to each cell according to the attribute values respectively edited for each cell of the plurality of cells;
- and in response to values from an nth element to a last element in the initial array being all null, deleting the nth element to the last element in the initial array to obtain the target array.

Optionally, the target array corresponding to the first cell includes a third element, a value of the third element is used to determine an operation type of a target cell attribute, the target cell attribute is a cell attribute corresponding to an element whose element value is null in the target array corresponding to the first cell, and the operation type includes: not modifying the target cell attribute, or modifying an attribute value of the target cell attribute to be null.

In a second aspect, the embodiments of the present disclosure provide a method for processing an online spreadsheet, and the method includes:

- receiving a message body, in which the message body is obtained based on editing data corresponding to a plurality of cells in the online spreadsheet, and the editing data includes attribute values respectively edited for each cell of the plurality of cells;
- acquiring the attribute values respectively edited for each cell of the plurality of cells according to the message body;
- and updating the online spreadsheet according to the attribute values respectively edited for each cell of the plurality of cells.

Optionally, the message body includes a target array corresponding to each cell, the target array corresponding to each cell is obtained according to the attribute values respectively edited for each cell of the plurality of cells, the plurality of cells includes a first cell, a target array corresponding to the first cell includes at least one element, each element of the at least one element corresponds to one cell attribute, and a value of each element is used to indicate an attribute value of a cell attribute corresponding to the each element.

Optionally, the target array corresponding to the first cell includes a first element, a cell attribute corresponding to the first element is a value of a cell, and a value of the first element is a value of the cell.

Optionally, the target array corresponding to the first cell includes a second element, a cell attribute corresponding to the second element is a first attribute, the first attribute is not a value of the cell, and a value of the second element is an identifier of an attribute value of the first attribute.

Optionally, the method further includes:

receiving an attribute manager corresponding to the first attribute, in which the attribute manager corresponding to the first attribute includes a corresponding relationship between the attribute value of the first attribute and the identifier.

Optionally, acquiring the attribute values respectively edited for each cell of the plurality of cells according to the message body includes:

determining the attribute value of the first attribute corresponding to the first cell according to the value of the second element and the attribute manager.

Optionally, a value of a last element of the target array is not null, and a length of the target array is less than a preset length.

Optionally, the target array corresponding to the first cell includes a third element, a value of the third element is used to determine an operation type of a target cell attribute, the target cell attribute is a cell attribute corresponding to an element whose element value is null in the target array corresponding to the first cell, and the operation type includes: not modifying the target cell attribute, or modifying an attribute value of the target cell attribute to be null.

Optionally, obtaining the attribute values edited respectively for each cell of the plurality of cells according to the message body includes:

determining the operation type corresponding to the target cell attribute according to the value of the third element;

and in response to the operation type corresponding to the target cell being modifying the attribute value of the target cell attribute to be null, determining the attribute value of the target cell attribute to be null.

In a third aspect, the embodiments of the present disclosure provide an apparatus for processing an online spreadsheet, and the apparatus includes:

a first acquisition unit, configured to acquire, in response to an editing operation triggered for the online spreadsheet, an editing area corresponding to the editing operation, in which the editing area includes a plurality of cells;

a second acquisition unit, configured to acquire editing data corresponding to the plurality of cells, in which the editing data includes attribute values respectively edited for each cell of the plurality of cells;

a processing unit, configured to obtain a message body according to the editing data;

and a first sending unit, configured to send the message body to a server.

Optionally, the second acquisition unit is configured to:

traverse each cell in the editing area to obtain the editing data.

Optionally, the processing unit is configured to:

obtain a target array corresponding to each cell according to the attribute values respectively edited for each cell of the plurality of cells, in which the plurality of cells includes a first cell, a target array corresponding to the first cell includes at least one element, each element of the at least one element corresponds to one cell attribute, and a value of each element is used to indicate an attribute value of a cell attribute corresponding to the each element;

and obtain a message body including the target array corresponding to each cell, according to the target array corresponding to each cell.

Optionally, the target array corresponding to the first cell includes a first element, a cell attribute corresponding to the first element is a value of a cell, and a value of the first element is a value of the cell.

Optionally, the target array corresponding to the first cell includes a second element, a cell attribute corresponding to the second element is a first attribute, the first attribute is not a value of the cell, and a value of the second element is an identifier of an attribute value of the first attribute.

Optionally, obtaining a target array corresponding to each cell according to the attribute values respectively edited for each cell of the plurality of cells, includes:

acquiring the attribute value of the first attribute corresponding to the first cell;

obtaining the identifier according to the attribute value of the first attribute;

and obtaining the target array corresponding to the first cell according to the identifier.

Optionally, obtaining the identifier according to the attribute value of the first attribute includes:

querying an attribute manager corresponding to the first attribute using the attribute value of the first attribute;

in response to the attribute manager including a corresponding relationship between the attribute value and the identifier corresponding to the attribute value, acquiring the identifier from the attribute manager;

and in response to the attribute manager not including the attribute value, generating the identifier, and storing the corresponding relationship between the attribute value and the identifier in the attribute manager.

Optionally, the apparatus further includes:

a second sending unit, configured to send the attribute manager corresponding to the first attribute to the server.

Optionally, obtaining a target array corresponding to each cell according to the attribute values respectively edited for each cell of the plurality of cells, includes:

obtaining an initial array corresponding to each cell according to the attribute values respectively edited for each cell of the plurality of cells;

and in response to values from an nth element to a last element in the initial array being all null, deleting the nth element to the last element in the initial array to obtain the target array.

Optionally, the target array corresponding to the first cell includes a third element, a value of the third element is used to determine an operation type of a target cell attribute, the target cell attribute is a cell attribute corresponding to an element whose element value is null in the target array corresponding to the first cell, and the operation type includes: not modifying the target cell attribute, or modifying an attribute value of the target cell attribute to be null.

In a fourth aspect, the embodiments of the present disclosure provide an apparatus for processing an online spreadsheet, and the apparatus includes:

a first receiving unit, configured to receive a message body, in which the message body is obtained based on editing data corresponding to a plurality of cells in the online spreadsheet, and the editing data includes attribute values respectively edited for each cell of the plurality of cells;

an acquisition unit, configured to acquire the attribute values respectively edited for each cell of the plurality of cells according to the message body;

and an updating unit, configured to update the online spreadsheet according to the attribute values respectively edited for each cell of the plurality of cells.

Optionally, the message body includes a target array corresponding to each cell, the target array corresponding to each cell is obtained according to the attribute values respectively edited for each cell of the plurality of cells, the plurality of cells includes a first cell, a target array corresponding to the first cell includes at least one element, each element of the at least one element corresponds to one cell attribute, and a value of each element is used to indicate an attribute value of a cell attribute corresponding to the each element.

Optionally, the target array corresponding to the first cell includes a first element, a cell attribute corresponding to the first element is a value of a cell, and a value of the first element is a value of the cell.

Optionally, the target array corresponding to the first cell includes a second element, a cell attribute corresponding to the second element is a first attribute, the first attribute is not a value of the cell, and a value of the second element is an identifier of an attribute value of the first attribute.

Optionally, the apparatus further includes:

a second receiving unit, configured to receive an attribute manager corresponding to the first attribute, in which the attribute manager corresponding to the first attribute includes a corresponding relationship between the attribute value of the first attribute and the identifier.

Optionally, the acquisition unit is configured to:

determine the attribute value of the first attribute corresponding to the first cell according to the value of the second element and the attribute manager.

Optionally, a value of a last element of the target array is not null, and a length of the target array is less than a preset length.

Optionally, the target array corresponding to the first cell includes a third element, a value of the third element is used to determine an operation type of a target cell attribute, the target cell attribute is a cell attribute corresponding to an element whose element value is null in the target array corresponding to the first cell, and the operation type includes: not modifying the target cell attribute, or modifying an attribute value of the target cell attribute to be null.

Optionally, the acquisition unit is configured to:

determine the operation type corresponding to the target cell attribute according to the value of the third element;

and in response to the operation type corresponding to the target cell being modifying the attribute value of the target cell attribute to be null, determine the attribute value of the target cell attribute to be null.

In a fifth aspect, the embodiments of the present disclosure provide a device, including a processor and a memory;

and the processor is configured to execute instructions stored in the memory, enabling the device to implement any of the methods described in the first aspect mentioned above, or any of the methods described in the second aspect mentioned above.

In a sixth aspect, the embodiments of the present disclosure provide a computer-readable storage medium including instructions, and the instructions instruct a device to implement any of the methods described in the first aspect mentioned above, or any of the methods described in the second aspect mentioned above.

In a seventh aspect, the embodiments of the present disclosure provide a computer program product, and the computer program product, when run on a computer, enables the computer to implement any of the methods described in the first aspect mentioned above, or any of the methods described in the second aspect mentioned above.

BRIEF DESCRIPTION OF DRAWINGS

In order to more clearly illustrate the technical solutions in the embodiments of the present disclosure, the drawings to be used in the description of the embodiments will be briefly described below. Apparently, the drawings in the following description are only some embodiments recorded in the present disclosure. For those of ordinary skill in the art, other drawings may be obtained based on these drawings without exerting creative efforts.

DETAILED DESCRIPTION

Figure 1:
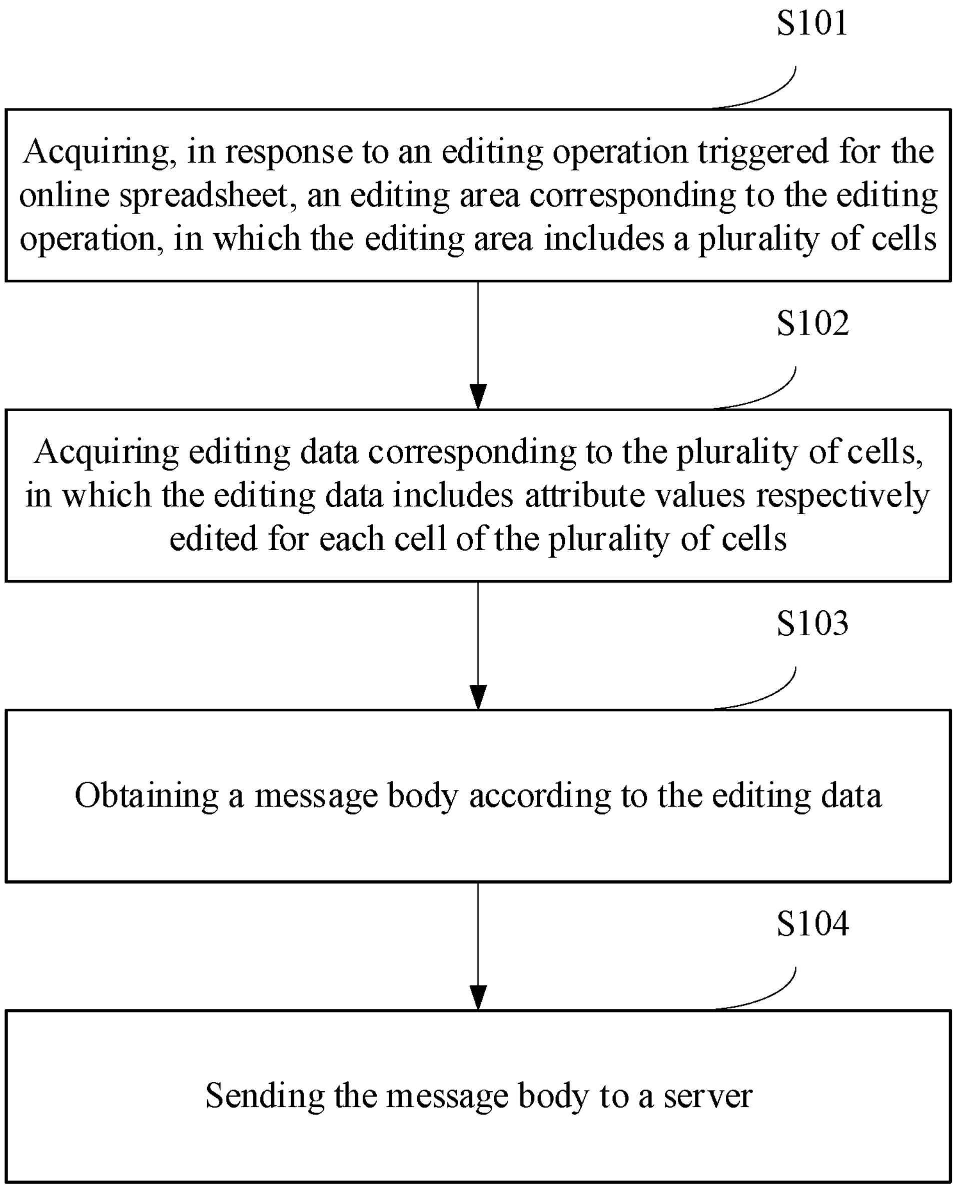
FIG. 1 is a schematic flowchart of a method for processing an online spreadsheet provided by the embodiments of the present disclosure.

In order to enable those skilled in the art to better understand the embodiments of the present disclosure, the technical solutions in the embodiments of the present disclosure will be described in a clearly and fully understandable way in conjunction with the drawings. Apparently, the described embodiments are only a part but not all of the embodiments of the present disclosure. Based on the embodiments of the present disclosure, those ordinarily skilled in the art can acquire other embodiment(s), without any inventive work, which should be within the scope of the present disclosure.

The inventor of the present disclosure found through research that at present, when a user edits an online spreadsheet, a server may synchronize the editing results to other users. Specifically, when a first user edits an online spreadsheet through a first client, the first client may generate a message body corresponding to each cell according to the edited cell, and send the message body corresponding to each cell to the server. The server processes the message body corresponding to each cell to update the online spreadsheet and synchronizes the updated online spreadsheet to clients of other users.

In the process of processing the aforementioned message body corresponding to each cell by the server, or in the process of sending the aforementioned message body corresponding to each cell by the client to the server, if the second user edits the online spreadsheet through a second client, it is easy for the content displayed in the online spreadsheet to be inconsistent with the user's operation. Especially when the user performs batch editing operations on a plurality of cells in the online spreadsheet, the inconsistency between the content displayed in the online spreadsheet and the user's operation is even more obvious.

For example, user A uses client A to modify values of 10 cells in the online spreadsheet, further, client A sends the message body corresponding to these 10 cells to the server. In the process of processing the message body sent from client A by the server, user B uses client B to clear the contents of these 10 cells, correspondingly, client B can send the message body corresponding to these 10 cells to the server.

Then in one scene: after user B uses client B to clear the contents of these 10 cells, these 10 cells displayed locally on the client are cleared. After the server completes processing the message body from client A, the server synchronizes the updated online spreadsheet to client B, which enables that the contents of the aforementioned 10 cells in the online spreadsheet displayed on client B are the values modified by user A. Further, after the server completes processing the message body from client B, the server synchronizes the updated online spreadsheet to client B. At this time, the contents of the aforementioned 10 cells in the online spreadsheet displayed by client B are cleared.

If the data processing efficiency of the server may be improved, for example, if the efficiency of the server processing the aforementioned message body from client A may be effectively improved, the above problem may be effectively avoided.

In view of this, the embodiments of the present disclosure provide a method and an apparatus for processing an online spreadsheet.

Various non-limiting embodiments of the present disclosure will be described in detail below with reference to the drawings.

Referring to FIG. 1, which is a schematic flowchart of a method for processing an online spreadsheet provided by the embodiments of the present disclosure. In one example, the method shown in FIG. 1 may be implemented by a client, for example, may be implemented by a client that supports an online spreadsheet function.

In the present embodiment, the method may include, for example, the following steps: S101-S104.

S101: acquiring, in response to an editing operation triggered for the online spreadsheet, an editing area corresponding to the editing operation, in which the editing area includes a plurality of cells.

In the embodiments of the present disclosure, the editing area corresponding to the editing operation may correspond to a rectangular area in an online spreadsheet, and the rectangular area includes a plurality of cells. In one example, the editing area may be represented by four parameters: starting row, starting column, number of rows, and number of columns.

S102: acquiring editing data corresponding to the plurality of cells, in which the editing data includes attribute values respectively edited for each cell of the plurality of cells.

After the editing area is determined, the attribute values respectively edited for each cell of the plurality of cells may be acquired, thereby obtaining the editing data. In one example, each cell in the editing area may be traversed to obtain the attribute values respectively edited for each cell, thereby obtaining the editing data.

In the embodiments of the present disclosure, a cell may include a plurality of cell attributes, for example, include cell attributes such as cell value, cell style, formula, and data validation. The attribute value mentioned here may be the attribute value of the cell attribute. When editing an online spreadsheet, the value of one or more cell attributes of a cell may be set (or modified).

S103: obtaining a message body according to the editing data.

In the embodiments of the present disclosure, in order to reduce the number of message bodies processed by the server to improve the data processing efficiency of the server, in the embodiments of the present disclosure, one message body may be obtained based on the editing data instead of generating a corresponding message body for each cell.

In one example, the message body including the attribute values respectively edited for each cell of the plurality of cells may be obtained directly based on the attribute values respectively edited for each cell of the plurality of cells.

In another example, in order to reduce the amount of data included in the message body and thus improve the efficiency of sending the message body to the server, S103 may also be implemented through the following steps A1-A2.

Step A1: obtaining a target array corresponding to each cell according to the attribute values respectively edited for each cell of the plurality of cells, in which the plurality of cells includes a first cell, a target array corresponding to the first cell includes at least one element, each element of the at least one element corresponds to one cell attribute, and a value of each element is used to indicate an attribute value of a cell attribute corresponding to the each element.

In the embodiments of the present disclosure, for the first cell, the attribute values respectively edited for the first cell may be carried through the target array corresponding to the first cell. Using an array to carry the attribute values edited for the first cell may reduce the amount of data compared to using objects to describe the attribute values respectively edited for the first cell.

For example, in a technology, the attribute values edited for the first cell may be described by an object, and the specific description is: {attribute 1: value 1; attribute 2, value 2; attribute 3, value 3}. However, when the attribute values respectively edited for the first cell are carried through the target array corresponding to the first cell, the target array is: {value 1; value 2; value 3}. The first element of the target array is used to indicate the attribute value of attribute 1, the second element of the target array is used to indicate the attribute value of attribute 2, and the third element of the target array is used to indicate the attribute value of attribute 3.

In the embodiments of the present disclosure, the target array corresponding to the first cell includes at least one element, each element of the at least one element corresponds to one cell attribute, and the value of each element is used to indicate the attribute value of the cell attribute corresponding to each element.

In one example, the value of each element may be the attribute value of the cell attribute corresponding to each element.

In another example, in order to reduce the data amount of the target array, the value of an element in the target array may be determined based on the cell attribute corresponding to the element.

As an example, the target array corresponding to the first cell includes a first element, and the cell attribute corresponding to the first element is a value of a cell, then the value of the first element may be the value of the first cell.

As another example, the target array corresponding to the first cell includes a second element, the cell attribute corresponding to the second element is a first attribute, and the first attribute is not a value of a cell, or the first attribute may be any cell attribute except the value of the cell. The value of the second element may be an identifier of an attribute value of the first attribute, instead of the attribute value of the first attribute. In general, the data amount of the attribute value of the first attribute is greater than the data amount of the identifier. Therefore, in this way, the data amount of the target array of the first cell may be reduced.

When the value of the second element is the identifier of the attribute value of the first attribute, the step A1, when implemented, may acquire the attribute value of the first attribute corresponding to the first cell, and further obtain the identifier based on the attribute value of the first attribute, thereby further obtaining the target array of the first cell based on the identifier.

In the embodiments of the present disclosure, obtaining the identifier based on the attribute value of the first attribute may be implemented in a variety of ways.

In one implementation, the attribute value of the first attribute may be calculated, for example by performing a hash calculation, to obtain the identifier.

In yet another implementation, the identifier may be determined in combination with an attribute manager corresponding to the first attribute. The attribute manager corresponding to the first attribute may be used to manage each attribute value of the first attribute and the identifier corresponding to each attribute value. In a specific example, the attribute value of the first attribute may be used to query the attribute manager corresponding to the first attribute, if the attribute manager includes the corresponding relationship between the attribute value of the first attribute and the identifier corresponding to the attribute value, the identifier is acquired from the attribute manager. If the attribute value is not included in the attribute manager, the identifier is generated, and the corresponding relationship between the attribute value and the identifier is stored in the attribute manager. The embodiments of this disclosure do not specifically limit the specific the implementation manner of generating the identifier. In one example, the identifier may be generated according to a preset algorithm. Regarding the preset algorithm, it may be a hash algorithm or other algorithms. For example, the identifier may be generated in a sequential numbering manner.

For example, in the initial situation, the content in the attribute manager corresponding to the first attribute is null, then the identifier of the attribute value of the first attribute corresponding to the first cell may be 0.

If the attribute manager of the first attribute includes the corresponding relationship between the value A and the identifier 0, and the attribute value of the first attribute is not A, the generated identifier of the attribute value of the first attribute may be 1.

In one example, if the identifier of the attribute value of the first attribute is obtained through the attribute manager of the first attribute, the attribute manager of the first attribute may also be sent to the server, to facilitate the server to determine the attribute value of the first attribute corresponding to the first cell based on the attribute manager of the first attribute and the value of the second element corresponding to the first cell.

In one example, considering that the user may not modify all attributes of a cell when editing the cell, for the cell, the value of the element corresponding to the cell attribute, whose attribute has not been modified, in the array corresponding to the cell is null. In order to further reduce the data amount of the target array, in one example, step A1 may be implemented through the following steps A11-A12.

Step A11: obtaining an initial array corresponding to each cell according to the attribute values respectively edited for each cell of the plurality of cells.

Step A12: in response to values from an nth element to a last element in the initial array being all null, deleting the nth element to the last element in the initial array to obtain the target array.

In the embodiments of the present disclosure, the initial array may include a plurality of elements, each element corresponds to one cell attribute, and the value of each element is used to indicate the attribute value of the cell attribute corresponding to the each element.

The initial array may include a first element and a second element. Regarding the value of the first element and the value of the second element, reference may be made to the relevant description section above, and the description will not be repeated here.

In the embodiments of the present disclosure, if the values from the nth element to the last element in the initial array are all null, in order to reduce the data amount of the array, the nth element to the last element in the initial array may be deleted to obtain the target array. Assuming that the value of n is 1, the target array may be null.

As mentioned above, for a cell, the value of the element corresponding to the cell attribute, whose attribute has not been modified, in the array corresponding to the cell is NULL. The user may also set the value of the cell attribute to be NULL. Therefore, when the value of an element in the array is NULL, the specific meaning of the NULL cannot be distinguished, that is, the user's operation type on the cell attribute corresponding to the element cannot be distinguished. For convenience of description, the cell attribute corresponding to the element, whose element value is null, in the array is called "target cell attribute", and the operation type of the target cell attribute may be not modifying the target cell attribute, or modifying the attribute value of the target cell attribute to be null.

In the embodiments of the present disclosure, in order to determine the operation type corresponding to the target cell attribute, for the target array corresponding to the first cell, the target array may include a third element. For example, the first element in the target data may be a third element, and the value of the third element may be used to determine the operation type of the target cell attribute. In one example, the length of the value of the third element may be M bits, and M is the total amount of cell attributes. When the operation type of the target cell attribute is to modify the attribute value of the target cell attribute to be null, the bit corresponding to the target cell attribute among the M bits is set (for example, set to 1); and when the operation type of the target cell attribute is to not modify the target cell attribute, the value of the bit corresponding to the target cell attribute among the M bits is a default value (for example, 0).

In this case, before obtaining the target array, the value of the third element may also be obtained according to the operation type of the target cell attribute, so that the target array may be obtained according to the value of the third element. In a specific example, if the aforementioned n is equal to 1, the target array may include only one element, and this element is the third element.

Step A2: obtaining a message body including the target array corresponding to each cell, according to the target array corresponding to each cell.

After obtaining the target array corresponding to each cell, the message body including the target array corresponding to each cell may be obtained based on the target array corresponding to each cell. In one example, the attribute manager corresponding to the first attribute may also be part of the message body. For this case, when step A2 is implemented, it may be that the message body may be obtained based on the target array corresponding to each cell and the attribute manager corresponding to each first attribute.

The target array corresponding to each cell and the message body will be described with reference to specific examples.

Figures 2, 3:
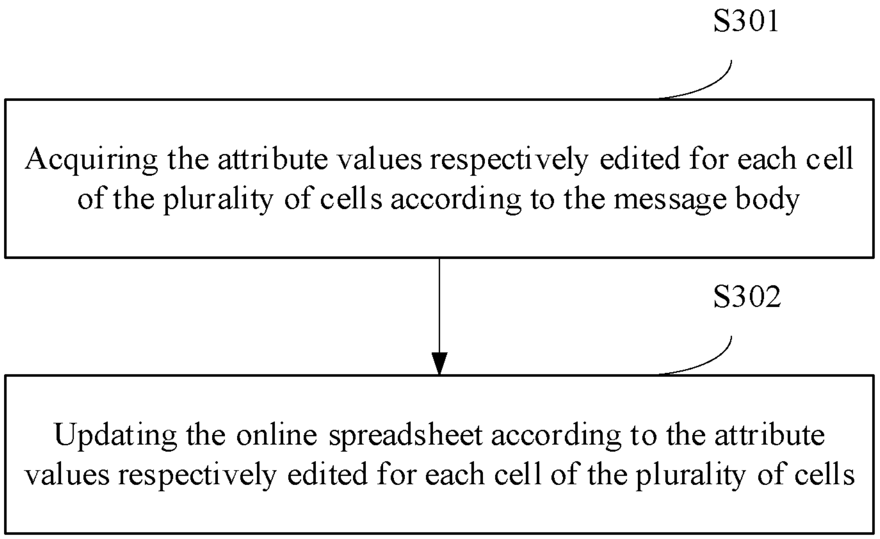
FIG. 2 is a schematic diagram of an online spreadsheet provided by the embodiments of the present disclosure.
FIG. 3 is a schematic flowchart of another method for processing an online spreadsheet provided by the embodiments of the present disclosure.

Referring to FIG. 2, which is a schematic diagram of an online spreadsheet provided by the embodiments of the present disclosure.

Assuming that the total number of cell attributes is M, then the target array may include up to 4 elements, the first element is the aforementioned third element, the second element is the aforementioned first element (that is, the element corresponding to the value of the cell), the third element is an element corresponding to the font, and the fourth element is an element corresponding to the font size. Assuming that the user changes the text font of the seven cells in the first to seventh rows of the online spreadsheet to Song typeface, for each cell, the target array may be: {4, NULL, "0"}.

In the above-mentioned target array, the value of the third element is 4, and its binary representation is 0100, which means that the second element NULL indicates that the value of the cell has not been modified. In addition, the cell attributes corresponding to the fourth element and the fifth element have not been modified, and the value "0" of the third element is the index of the Song typeface.

The message body may be, for example: {[4, NULL, "0"], [4, NULL, "0"], [4, NULL, "0"], . . . , [4, NULL, "0"]; [Font: Song typeface]}. Among them, [Font: Song typeface] represents the attribute manager corresponding to the font, and its specific meaning includes: the identifier of Song typeface is 0. Of course, if the attribute manager corresponding to the font is: [Font: Song typeface, Kai typeface], it means that the identifier of Song typeface is 0 and the identifier of Kai typeface is 1.

S104: sending the message body to a server.

After obtaining the message body, the message body may be sent to a server.

In one example, after sending the message body to the server, the attribute manager corresponding to the first attribute may be destroyed.

After receiving the message body, the server may perform steps S301-S302 illustrated in FIG. 3. FIG. 3 is a schematic flowchart of another method for processing an online spreadsheet provided by the embodiments of the present disclosure.

S301: acquiring the attribute values respectively edited for each cell of the plurality of cells according to the message body.

In one example, if the message body includes the target array corresponding to each cell, and the value of the second element is the identifier of the attribute value of the first attribute, the server may also receive the attribute manager corresponding to the first attribute sent by the client. For this case, S301 may, in a specific implementation, determine the attribute value of the first attribute corresponding to the first cell, based on the value of the second element and the attribute manager. Here combine the above examples for explanation, assuming that the message body is: {[4, NULL, "0"], [4, NULL, "0"], [4, NULL, "0"], . . . , [4, NULL, "0"]; [Font: Song typeface]}, then for any target array [4, NULL, "0"], the server may determine the font of the cell is modified to Song typeface according to the identifier "0" and the attribute manager [Font: Song typeface].

In another example, if the target array includes a third element, the server may determine the operation type corresponding to the target cell attribute based on the value of the third element. For example, in the above example, the message body is {[4, NULL, "0"], [4, NULL, "0"], [4, NULL, "0"], . . . , [4, NULL, "0"]; [Font: Song typeface]}, then the server may determine, based on the value "4" of the third element, that the second element NULL indicates that the value of the cell has not been modified. In addition, the cell attributes corresponding to the fourth element and the fifth element have not been modified.

In one example, if the operation type corresponding to the target cell is to modify the attribute value of the target cell attribute to be null, the server may determine that the attribute value of the target cell attribute is null.

S302: updating the online spreadsheet according to the attribute values respectively edited for each cell of the plurality of cells.

After acquiring the attribute values respectively edited for each cell of the plurality of cells, the server may, based on the attribute values respectively edited for each cell of the plurality of cells, update the online spreadsheet. For example, the attribute value of each cell in the online spreadsheet may be modified into the attribute values respectively edited for each cell of the plurality of cells.

In one example, if the operation type corresponding to the target cell is not modifying the target cell attribute, the server does not need to modify the target cell attribute.

In one example, after updating the online spreadsheet, the server may synchronize the updated online spreadsheet to each client.

In the embodiments of the present disclosure, even if the editing operation is triggered for a plurality of cells, only one message body may be sent to the server, thereby reducing the number of message bodies processed by the server, correspondingly improving the processing efficiency of the server, and correspondingly enabling that the content displayed in the online spreadsheet is consistent with the user's operation.

Moreover, in the embodiments of the present disclosure, the amount of data carried by the message body is also streamlined, thereby reducing the amount of data sent by the client to the server, and accordingly, improving the efficiency of sending the message body to the server, and furthermore, enabling that the content displayed in the online spreadsheet is consistent with the user's operation.

Based on the methods provided in the above embodiments, the embodiments of the present disclosure further provide a corresponding apparatus. The apparatus is introduced below with reference to the drawings.

Figure 4:
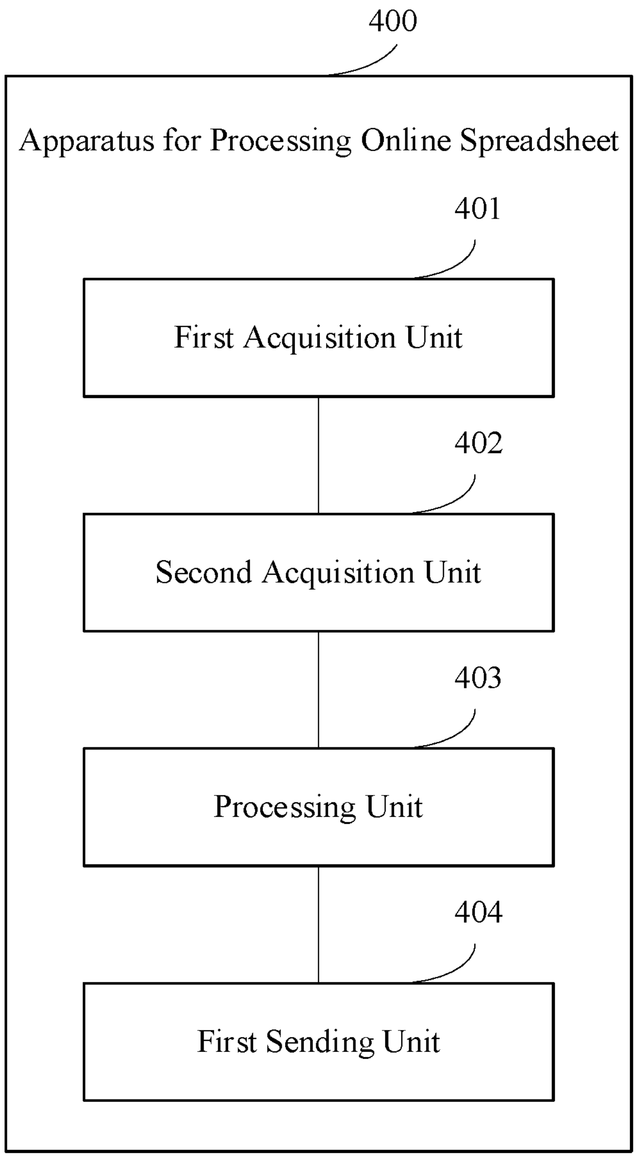
FIG. 4 is a schematic structural diagram of an apparatus for processing an online spreadsheet provided by the embodiments of the present disclosure.

Referring to FIG. 4, which is a schematic structural diagram of an apparatus for processing an online spreadsheet provided by the embodiments of the present disclosure. The apparatus 400 shown in FIG. 4 may be, for example, applied to a client, and the apparatus 400 includes a first acquisition unit 401, a second acquisition unit 402, a processing unit 403 and a first sending unit 404.

The first acquisition unit 401 is configured to acquire, in response to an editing operation triggered for the online spreadsheet, an editing area corresponding to the editing operation, in which the editing area includes a plurality of cells.

The second acquisition unit 402 is configured to acquire editing data corresponding to the plurality of cells, in which the editing data includes attribute values respectively edited for each cell of the plurality of cells.

The processing unit 403 is configured to obtain a message body according to the editing data.

The first sending unit 404 is configured to send the message body to a server.

Optionally, the second acquisition unit 402 is configured to:

traverse each cell in the editing area to obtain the editing data.

Optionally, the processing unit 403 is configured to:

obtain a target array corresponding to each cell according to the attribute values respectively edited for each cell of the plurality of cells, in which the plurality of cells includes a first cell, a target array corresponding to the first cell includes at least one element, each element of the at least one element corresponds to one cell attribute, and a value of each element is used to indicate an attribute value of a cell attribute corresponding to the each element;

and obtain a message body including the target array corresponding to each cell, according to the target array corresponding to each cell.

Optionally, the target array corresponding to the first cell includes a first element, a cell attribute corresponding to the first element is a value of a cell, and a value of the first element is a value of the cell.

Optionally, the target array corresponding to the first cell includes a second element, a cell attribute corresponding to the second element is a first attribute, the first attribute is not a value of the cell, and a value of the second element is an identifier of an attribute value of the first attribute.

Optionally, obtaining a target array corresponding to each cell according to the attribute values respectively edited for each cell of the plurality of cells, includes:

acquiring the attribute value of the first attribute corresponding to the first cell;

obtaining the identifier according to the attribute value of the first attribute;

and obtaining the target array corresponding to the first cell according to the identifier.

Optionally, obtaining the identifier according to the attribute value of the first attribute includes:

querying an attribute manager corresponding to the first attribute using the attribute value of the first attribute;

in response to the attribute manager including a corresponding relationship between the attribute value and the identifier corresponding to the attribute value, acquiring the identifier from the attribute manager;

and in response to the attribute manager not including the attribute value, generating the identifier, and storing the corresponding relationship between the attribute value and the identifier in the attribute manager.

Optionally, the apparatus further includes:

a second sending unit, configured to send the attribute manager corresponding to the first attribute to the server.

Optionally, obtaining a target array corresponding to each cell according to the attribute values respectively edited for each cell of the plurality of cells, includes:

obtaining an initial array corresponding to each cell according to the attribute values respectively edited for each cell of the plurality of cells;

and in response to values from an nth element to a last element in the initial array being all null, deleting the nth element to the last element in the initial array to obtain the target array.

Optionally, the target array corresponding to the first cell includes a third element, a value of the third element is used to determine an operation type of a target cell attribute, the target cell attribute is a cell attribute corresponding to an element whose element value is null in the target array corresponding to the first cell, and the operation type includes: not modifying the target cell attribute, or modifying an attribute value of the target cell attribute to be null.

Figure 5:
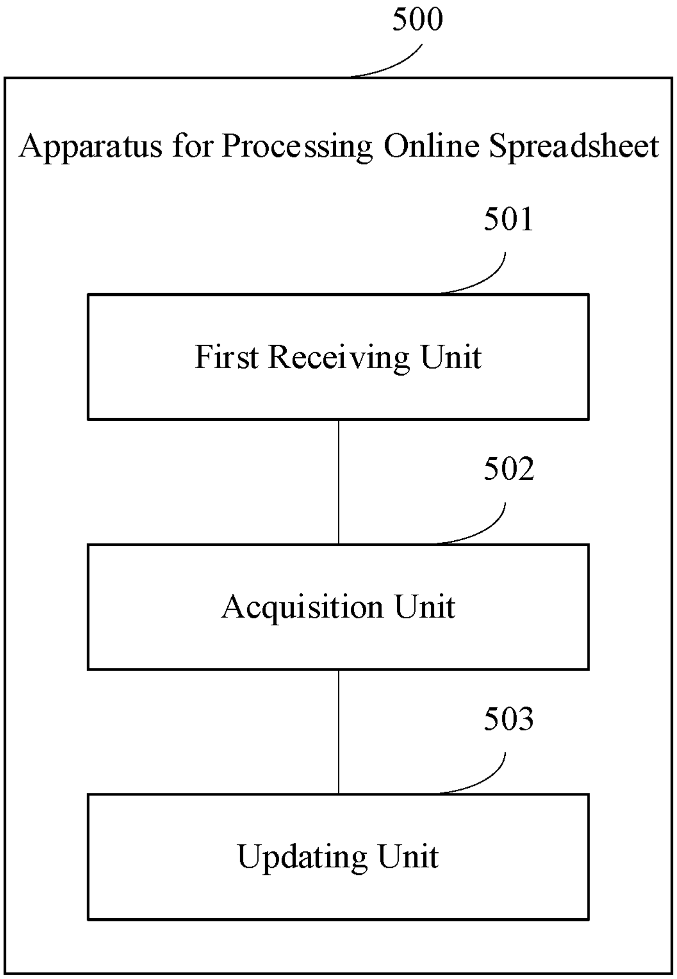
FIG. 5 is a schematic structural diagram of another apparatus for processing an online spreadsheet provided by the embodiments of the present disclosure.

Referring to FIG. 5, which is a schematic structural diagram of another apparatus for processing an online spreadsheet provided by the embodiments of the present disclosure. The apparatus 500 shown in FIG. 5 may be, for example, applied to a server. The apparatus 500 includes a first receiving unit 501, an acquisition unit 502 and an updating unit 503.

The first receiving unit 501 is configured to receive a message body, in which the message body is obtained based on editing data corresponding to a plurality of cells in the online spreadsheet, and the editing data includes attribute values respectively edited for each cell of the plurality of cells.

The acquisition unit 502 is configured to acquire the attribute values respectively edited for each cell of the plurality of cells according to the message body.

The updating unit 503 is configured to update the online spreadsheet according to the attribute values respectively edited for each cell of the plurality of cells.

Optionally, the message body includes a target array corresponding to each cell, the target array corresponding to each cell is obtained according to the attribute values respectively edited for each cell of the plurality of cells, the plurality of cells includes a first cell, a target array corresponding to the first cell includes at least one element, each element of the at least one element corresponds to one cell attribute, and a value of each element is used to indicate an attribute value of a cell attribute corresponding to the each element.

Optionally, the target array corresponding to the first cell includes a first element, a cell attribute corresponding to the first element is a value of a cell, and a value of the first element is a value of the cell.

Optionally, the target array corresponding to the first cell includes a second element, a cell attribute corresponding to the second element is a first attribute, the first attribute is not a value of the cell, and a value of the second element is an identifier of an attribute value of the first attribute.

Optionally, the apparatus further includes:

a second receiving unit, configured to receive an attribute manager corresponding to the first attribute, in which the attribute manager corresponding to the first attribute includes a corresponding relationship between the attribute value of the first attribute and the identifier.

Optionally, the acquisition unit 502 is configured to:

determine the attribute value of the first attribute corresponding to the first cell according to the value of the second element and the attribute manager.

Optionally, a value of a last element of the target array is not null, and a length of the target array is less than a preset length.

Optionally, the target array corresponding to the first cell includes a third element, a value of the third element is used to determine an operation type of a target cell attribute, the target cell attribute is a cell attribute corresponding to an element whose element value is null in the target array corresponding to the first cell, and the operation type includes: not modifying the target cell attribute, or modifying an attribute value of the target cell attribute to be null.

Optionally, the acquisition unit 502 is configured to:

determine the operation type corresponding to the target cell attribute according to the value of the third element;

and in response to the operation type corresponding to the target cell being modifying the attribute value of the target cell attribute to be null, determine the attribute value of the target cell attribute to be null.

Regarding the specific implementations of the apparatuses 400 and 500, reference may be made to the relevant descriptions of the above method embodiments, and the description will not be repeated here.

The embodiments of the present disclosure further provide a device, which includes a processor and a memory.

The processor is configured to execute instructions stored in the memory, enabling the device to implement the method for processing an online spreadsheet described in any of the above method embodiments.

The embodiments of the present disclosure further provide a computer-readable storage medium including instructions, and the instructions instruct a device to implement the method for processing an online spreadsheet described in any of the above method embodiments.

The embodiments of the present disclosure further provide a computer program product, and the computer program product, when run on a computer, enables the computer to implement the method for processing an online spreadsheet described in any of the above method embodiments.

Other embodiments of the present disclosure will be readily apparent to those skilled in the art from consideration of the present disclosure. The present disclosure is intended to cover any variations, uses, or adaptations of the disclosure that follow the general principles of the present disclosure and include common knowledge or customary technical means in the art that are not disclosed in the present disclosure. The embodiments of the present disclosure are to be regarded as exemplary only, and the true scope and spirit of the present disclosure is indicated by the following claims.

It should be understood that the present disclosure is not limited to the precise structure described above and illustrated in the drawings, and various modifications and changes may be made without departing from the scope thereof. The scope of the present disclosure is limited only by the appended claims.

The above are only preferred embodiments of the present disclosure and are not intended to limit the present disclosure, and any modifications, equivalent substitutions, improvements, etc. made within the spirit and principles of the present disclosure shall be included in the scope of protection of the present disclosure.

The invention claimed is:

1. A method for processing an online spreadsheet, comprising:

acquiring, in response to an editing operation triggered by a user for the online spreadsheet display on a client terminal and received by the client terminal, an editing area corresponding to the editing operation by the client terminal, wherein the editing area comprises a plurality of cells;

acquiring editing data corresponding to the plurality of cells by the client terminal, wherein the editing data comprises attribute values respectively edited for each cell of the plurality of cells;

obtaining a message body according to the editing data; and sending the message body to a server by the client terminal, wherein the obtaining the message body according to the editing data comprises:

obtaining a target array corresponding to each cell according to the attribute values respectively edited for each cell of the plurality of cells, wherein the plurality of cells comprises a first cell, a target array corresponding to the first cell comprises at least one element, each element of the at least one element corresponds to one cell attribute, and a value of each element is used to indicate an attribute value of a cell attribute corresponding to the each element; and obtaining a message body comprising the target array corresponding to each cell, according to the target array corresponding to each cell, wherein the target array corresponding to the first cell comprises a second element, a cell attribute corresponding to the second element is a first attribute, the first attribute is not a value of the cell, and a value of the second element is an identifier of an attribute value of the first attribute, wherein the obtaining a target array corresponding to each cell according to the attribute values respectively edited for each cell of the plurality of cells, comprises:

acquiring the attribute value of the first attribute corresponding to the first cell;

obtaining the identifier according to the attribute value of the first attribute; and obtaining the target array corresponding to the first cell according to the identifier, wherein the obtaining the identifier according to the attribute value of the first attribute comprises:

querying an attribute manager corresponding to the first attribute using the attribute value of the first attribute;

in response to the attribute manager comprising a corresponding relationship between the attribute value and the identifier corresponding to the attribute value, acquiring the identifier from the attribute manager; and in response to the attribute manager not comprising the attribute value, generating the identifier, and storing the corresponding relationship between the attribute value and the identifier in the attribute manager.

2. The method according to claim 1, wherein the acquiring editing data corresponding to the plurality of cells comprises:

traversing each cell in the editing area to obtain the editing data.

3. The method according to claim 1, wherein the target array corresponding to the first cell comprises a first element, a cell attribute corresponding to the first element is a value of a cell, and a value of the first element is a value of the cell.

4. The method according to claim 1, further comprising:

sending the attribute manager corresponding to the first attribute to the server.

5. A device, comprising a processor and a memory, wherein the processor is configured to execute instructions stored in the memory, enabling the device to implement the method according to claim 1.

6. A method for processing an online spreadsheet, comprising:

receiving a message body send by a client terminal, wherein the message body is obtained based on editing data corresponding to a plurality of cells by the client terminal in the online spreadsheet displayed on the client terminal, and the editing data comprises attribute values respectively edited for each cell of the plurality of cells;

acquiring the attribute values respectively edited for each cell of the plurality of cells according to the message body; and updating the online spreadsheet according to the attribute values respectively edited for each cell of the plurality of cells, wherein the message body comprises a target array corresponding to each cell, the target array corresponding to each cell is obtained according to the attribute values respectively edited for each cell of the plurality of cells, the plurality of cells comprises a first cell, a target array corresponding to the first cell comprises at least one element, each element of the at least one element corresponds to one cell attribute, and a value of each element is used to indicate an attribute value of a cell attribute corresponding to the each element, wherein the target array corresponding to the first cell comprises a second element, a cell attribute corresponding to the second element is a first attribute, the first attribute is not a value of the cell, and a value of the second element is an identifier of an attribute value of the first attribute, wherein the method further comprises:

receiving an attribute manager corresponding to the first attribute, wherein the attribute manager corresponding to the first attribute comprises a corresponding relationship between the attribute value of the first attribute and the identifier.

7. The method according to claim 6, wherein the target array corresponding to the first cell comprises a first element, a cell attribute corresponding to the first element is a value of a cell, and a value of the first element is a value of the cell.

8. The method according to claim 6, wherein the acquiring the attribute values respectively edited for each cell of the plurality of cells according to the message body comprises:

determining the attribute value of the first attribute corresponding to the first cell according to the value of the second element and the attribute manager.

9. The method according to claim 6, wherein a value of a last element of the target array is not null, and a length of the target array is less than a preset length.

10. The method according to claim 6, wherein the target array corresponding to the first cell comprises a third element, a value of the third element is used to determine an operation type of a target cell attribute, the target cell attribute is a cell attribute corresponding to an element whose element value is null in the target array corresponding to the first cell, and the operation type comprises: not modifying the target cell attribute, or modifying an attribute value of the target cell attribute to be null.

11. The method according to claim 10, wherein the obtaining the attribute values edited respectively for each cell of the plurality of cells according to the message body comprises:

determining the operation type corresponding to the target cell attribute according to the value of the third element; and in response to the operation type corresponding to the target cell being modifying the attribute value of the target cell attribute to be null, determining the attribute value of the target cell attribute to be null.

12. A method for processing an online spreadsheet, comprising:

acquiring, in response to an editing operation triggered by a user for the online spreadsheet display on a client terminal and received by the client terminal, an editing area corresponding to the editing operation by the client terminal, wherein the editing area comprises a plurality of cells;

acquiring editing data corresponding to the plurality of cells by the client terminal, wherein the editing data comprises attribute values respectively edited for each cell of the plurality of cells;

obtaining a message body according to the editing data; and sending the message body to a server by the client terminal, wherein the obtaining the message body according to the editing data comprises:

obtaining a target array corresponding to each cell according to the attribute values respectively edited for each cell of the plurality of cells, wherein the plurality of cells comprises a first cell, a target array corresponding to the first cell comprises at least one element, each element of the at least one element corresponds to one cell attribute, and a value of each element is used to indicate an attribute value of a cell attribute corresponding to the each element; and obtaining a message body comprising the target array corresponding to each cell, according to the target array corresponding to each cell, wherein the obtaining a target array corresponding to each cell according to the attribute values respectively edited for each cell of the plurality of cells, comprises:

obtaining an initial array corresponding to each cell according to the attribute values respectively edited for each cell of the plurality of cells; and in response to values from an nth element to a last element in the initial array being all null, deleting the nth element to the last element in the initial array to obtain the target array.

13. The method according to claim 12, wherein the target array corresponding to the first cell comprises a third element, a value of the third element is used to determine an operation type of a target cell attribute, the target cell attribute is a cell attribute corresponding to an element whose element value is null in the target array corresponding to the first cell, and the operation type comprises: not modifying the target cell attribute, or modifying an attribute value of the target cell attribute to be null.

* * * * *